US007277849B2

(12) United States Patent
Streich et al.

(10) Patent No.: US 7,277,849 B2
(45) Date of Patent: Oct. 2, 2007

(54) EFFICIENCY IMPROVEMENTS IN SCALABLE AUDIO CODING

(75) Inventors: Sebastian Streich, Lünen (DE); Miikka Vilermo, Tampere (FI)

(73) Assignee: Nokia Corporation, Espoo (FI)

( * ) Notice: Subject to any disclaimer, the term of this patent is extended or adjusted under 35 U.S.C. 154(b) by 946 days.

(21) Appl. No.: 10/388,379

(22) Filed: Mar. 12, 2003

(65) Prior Publication Data
US 2003/0220783 A1 Nov. 27, 2003

(30) Foreign Application Priority Data
Mar. 12, 2002 (WO) .................. PCT/IB02/00723

(51) Int. Cl.
*G10L 19/00* (2006.01)
(52) U.S. Cl. .................. 704/229; 704/230; 704/500
(58) Field of Classification Search ............... 704/229, 704/500, 501, 230
See application file for complete search history.

(56) References Cited

U.S. PATENT DOCUMENTS

| | | | | | |
|---|---|---|---|---|---|
| 4,689,760 | A | * | 8/1987 | Lee et al. ................... 370/526 |
| 5,347,611 | A | * | 9/1994 | Chang ........................ 704/206 |
| 5,349,383 | A | * | 9/1994 | Parke et al. ............. 375/240.1 |
| 5,398,069 | A | * | 3/1995 | Huang et al. .......... 375/240.22 |
| 5,913,187 | A | * | 6/1999 | Mermelstein ............... 704/219 |
| 5,995,923 | A | * | 11/1999 | Mermelstein et al. ........ 704/219 |
| 6,094,636 | A | * | 7/2000 | Kim ........................... 704/500 |
| 6,108,626 | A | * | 8/2000 | Cellario et al. ............. 704/230 |
| 6,182,031 | B1 | * | 1/2001 | Kidder et al. ............... 704/205 |
| 6,349,284 | B1 | * | 2/2002 | Park et al. ................... 704/500 |
| 6,446,037 | B1 | * | 9/2002 | Fielder et al. .............. 704/229 |
| 6,535,845 | B2 | * | 3/2003 | Van Der Vleuten et al. ..... 704/219 |
| 6,732,075 | B1 | * | 5/2004 | Omori et al. ................ 704/250 |
| 6,934,679 | B2 | * | 8/2005 | Zhou et al. .................. 704/230 |
| 6,947,886 | B2 | * | 9/2005 | Rose et al. .............. 704/200.1 |
| 2002/0049583 | A1 | * | 4/2002 | Bruhn et al. ................. 704/203 |
| 2002/0052734 | A1 | * | 5/2002 | Unno et al. .................. 704/207 |

FOREIGN PATENT DOCUMENTS

EP 1173028 1/2002

OTHER PUBLICATIONS

Pedro Cuenca, Rafael Casado, Antonio Garrido, Francisco Quiles, Luis Orozco-Barbosa, "Performance Evaluation of Cell Discarding MEchanisms for Hierarchical VBR MPEG-2 Video Traffic over ATM Networks" IEEE, 1998.*

(Continued)

*Primary Examiner*—Tālivaldis Ivars Šmits
*Assistant Examiner*—E. Yen

(57) ABSTRACT

An audio encoding method of coding audio signals into a layered data stream having a first layer and a second layer is presented. The second layer serves as an enhancement of the first layer. The method involves forming an original digital audio signal, encoding the original signal to obtain a first layer signal, producing a residual signal to reflect a difference between the original signal and the first layer signal, selecting either the original signal or the residual signal for encoding, and producing a second layer signal by encoding the selected signal. Moreover, the residual signal is evaluated and, in case the result of the evaluation meets given criteria, a predetermined low-entropy signal is selected to be encoded as the second layer signal, instead of the original signal or the residual signal.

29 Claims, 6 Drawing Sheets

Modified Rate/Distortion Control Loop

OTHER PUBLICATIONS

Bernhard Grill, Bodo Teichmann, "Scalable Joint Stereo Coding", AES, 1998.*

Jurgen Herre, Bernhard Grill, "Overview of MPEG-4 Audio and its Applications in Mobile Communications", IEEE, 2000.*

Ashish Aggarwal, Shankar L. Regunathan, Kenneth Rose, "Compander Domain Approach to Scalable AAC", AES, 2001.*

Ashish Aggarwal, Shankar L. Regunathan, Kenneth Rose, "Asymptotically Optimal Scalable Coding for Minimum Weighted Mean Square Error", IEEE, 2001.*

Ashish Aggarwal, Kenneth Rose, "A Conditional Enhancement-Layer Quantizer for the Advanced Audio Coder", IEEE, 2002.*

Mat Hans, Ronald Schafer, "An MPEG Audio Layered Transcoder", AES, 1998.*

Y. Nakajima, H. Yanagihara, A. Yoneyama, M. Sugano, "MPEG Audio Bit Rate Scaling on Coded Data Domain", IEEE, 1998.*

Takehiro Moriya, Naoki Iwakami, Akio Jin, Takeshi Mori, "A Design of Lossy and Lossless Scalable Audio Coding", IEEE, 2000.*

Bernd Edler, "Speech Coding in MPEG-4", International Journal of Speech Tecnology 2, 1999.*

"MPEG-4: A Multimedia Standard for the Third Millenium, Part 1", S. Battista et al, *IEEE Multimedia*, Oct.-Dec. 1999, pp. 74-83.

"Universal Successive Refinement of CELP Speech Coders", H. Dong et al, *Proc. 2001 IEEE Int'l Conf. on Acoustics, Speech and Signal Processing*, pp. 713-716.

"Enhancing MPEG-4 CELP by Jointly Optimized Inter/Intra-Frame LSP Predictions", K. Koishida et al, *Proc. 2000 IEEE Conf. on Speech Coding*, pp. 90-92.

"An Excitation Level Based Psychoacoustic Model for Audio Compression", Y. Wang et al, from the Internet.

ISO/IEC 14496-3-2001(E), pp. 294-302.

ISO.IEC 14496-3-2001(E), Contents for Subpart 4, General Audio Coding- (GA)—AAC, TwinVQ, BSAC. pp. 1-9 and 47-53.

3GPP TS 26.190 v5.0.0 (Mar. 2001), 3rd Generation Partnership Project; Technical Specification Group Services and System Aspects; Speech Codec Speech Processing functions; AMR Wideband Speech Codec; Transcoding functions (Release 5).

* cited by examiner

EFFICIENCY IMPROVEMENTS IN SCALABLE AUDIO CODING

CROSS-REFERENCE TO RELATED APPLICATIONS

This application claims priority from International Application Serial No. PCT/IB02/00723, filed Mar. 12, 2002.

FIELD OF THE INVENTION

The present invention relates to an audio encoding method of coding audio signals into a layered data stream having a first layer and a second layer, where the second layer serves as an enhancement of the first layer. More specifically, the present invention relates to an audio encoding method, where an original digital audio signal is encoded to obtain a first layer signal, a residual signal is produced to reflect a difference between the original signal and the first layer signal, and either the original signal or the residual signal is selected to be encoded into a second layer signal.

BACKGROUND OF THE INVENTION

Audio, i.e. acoustic energy, is analogue by its nature. It is convenient, however, to represent audio in digital form for storage or transmission purposes. Pure digital audio data obtained by sampling and digitizing an analog audio signal requires large storage capacity and channel bandwidth, particularly for high-quality audio, which for instance may be represented by 16 bits per sample at a sampling rate of 44 kHz (normal audio CD quality). Hence, digital audio is normally compressed according to various known source coding techniques.

Perceptual audio coding techniques, such as MPEG Layer-3 (MP3), MPEG-2 and MPEG-4, all make use of the signal masking properties of the human ear in order to reduce the amount of data. By doing so, the quantization noise is distributed to frequency bands in such a way that it is masked by the total signal, i.e. it remains inaudible. Considerable storage size reduction is possible with little or no perceptible loss of audio quality.

Perceptual audio coding techniques are often scalable and produce a layered bit stream having a base layer and at least one enhancement layer. This allows bit-rate scalability, i.e. decoding at different audio quality levels at the decoder side or reducing the bitrate in the network by traffic shaping or conditioning. One approach is to provide base layer encoding in mono only, and to provide an enhancement layer encoding which adds stereo quality to the audio. In this way, it is possible at the decoder side to choose to decode the base layer information only (for instance in case the receiver device at the decoder side only has one speaker) or to decode the base layer information as well as the enhancement layer information so as to generate stereo sound.

Within the context of scalable audio coding, "base layer" and "core layer" are used as synonyms.

ISO/IEC 14496-3:2001(E), Subpart 4, describes a portion of the MPEG-4 Audio standard and suggests a combination of either an MPEG-4 compliant core codec, or an external core codec of CELP type (Code Excited Linear Prediction), with an AAC (Advanced Audio Coding) enhancement layer codec so as to provide efficient bit-rate scalability.

The AMR-WB (Adaptive Multi-Rate Wideband) speech codec is one example of a CELP-type codec, which will be used in 3rd generation mobile terminals and is described in 3rd Generation Partnership Project (3GPP) TS 26.190 V5.0.0 (2001-03).

In a scalable audio coding arrangement like the one referred to in aforesaid MPEG-4 Audio standard, a frequency selective switching unit (FSSU) in the enhancement layer encoder estimates the amount of bits needed to encode either the original audio signal or a residual signal, which is derived by subtracting the original signal and the reconstructed output signal of the preceding layer (the core layer). The FSSU always selects the alternative which will need fewer bits for encoding. This decision is made for each individual frequency sub-band (i.e. for each fixed group of spectral lines representing the signal) within an audio frame. To allow reconstruction on the decoder side the encoder has to transmit FSS control information for indicating which of the two alternatives was selected for each sub-band in each audio frame. According to this control information, the output signal from the enhancement layer decoder will then be added to the output of the core layer decoder only in those sub-bands where the residual signal has been encoded.

However, the present inventors have identified the following problem with scalable audio coding arrangements like the one described above. Particularly for low and modest bit rates, e.g. in the range of 12 kbps-24 kbps, there will sometimes not be enough bits available to encode the enhancement signal in such a way, that the quantization errors remain imperceptible. At the decoder side, such errors will sound like cracks, pops, etc, and will therefore be very disturbing. In fact, such errors can even lead to a degradation in perceived quality compared to the output signal of the core layer alone.

In the prior art, to prevent this effect, one would either have to restrict the encoded frequency range, at the risk of losing audible information, or increase the bit rate for the enhancement layer codec, which may not be a desirable or even possible option in view of available network bandwidth.

SUMMARY OF THE INVENTION

In view of the above, an objective of the invention is to solve or at least reduce the problem discussed above and to provide improved sound quality at the same or even lower bit rates than in the prior art.

Generally, the above objective is achieved by an audio encoding method, an audio encoder, an audio transcoder, an audio decoder, a computer program product, an integrated circuit and a station for a mobile telecommunications network according to the attached independent patent claims.

Simply put, the objective has been achieved by considering an additional alternative for encoding the enhancement layer signal, in addition to the selection between using either the residual or the original signal in the prior art. In a preferred embodiment, the alternative consists of accepting the output signal of the core layer directly as the output of the enhancement layer for some frequency sub-bands. This is done by replacing the residual signal with zeros, or with another similar low-entropy signal, and indicating in aforesaid FSS control information that the residual signal has been encoded for the sub-band in question. Hence, no additional overhead is needed at the decoder side; if the FSS control information indicates that the residual signal has been encoded and the corresponding frequency sub-bands have been replaced by zeros in the encoder, the output signal of the core layer in the decoder will be added for these sub-bands and thus replace the zeros.

The invention provides at least two major benefits:

Firstly, the invention may be used to ensure that the error caused by quantization is never larger than the error caused by using the preceding layer alone. In addition, because the audible errors caused by quantization are very annoying, the encoder of the current layer can be forced to use non-zero values for encoding only in those frequency sub-bands where masking of the quantization error can be assured. Moreover, a "band split" approach is available, according to which the output signal of the preceding layer is left completely unmodified for the low-end frequency range, whereas the enhancement layer codec only encodes some additional high frequency components above the low-end frequency range. This approach is particularly applicable for samples containing speech and a core layer codec which performs well on speech coding.

Secondly, the invention reduces the needed number of bits in the enhancement layer encoding process. Encoding one frequency sub-band containing only zeros compared to non-zero values will usually save some bits even in the worst case. In the experiments, up to about 10% saving in the total bit rate was found to be achievable thanks to this aspect of the invention. This second benefit can either be used to reduce the bit rate of the enhancement layer codec or to reduce the quantization error of the other frequency bands in the same frame.

In addition to the above, the present inventors envisage faster encoding and decoding of audio signals, provided that the encoder and decoder are designed to encode and decode, respectively, zeros in an efficient manner.

Other objectives, features and advantages of the present invention will appear from the following detailed disclosure, from the attached dependent claims as well as from the drawings.

BRIEF DESCRIPTION OF THE DRAWINGS

A preferred embodiment of the present invention will now be described in more detail, reference being made to the enclosed drawings, in which.

DETAILED DISCLOSURE OF EMBODIMENTS

Figure 1:
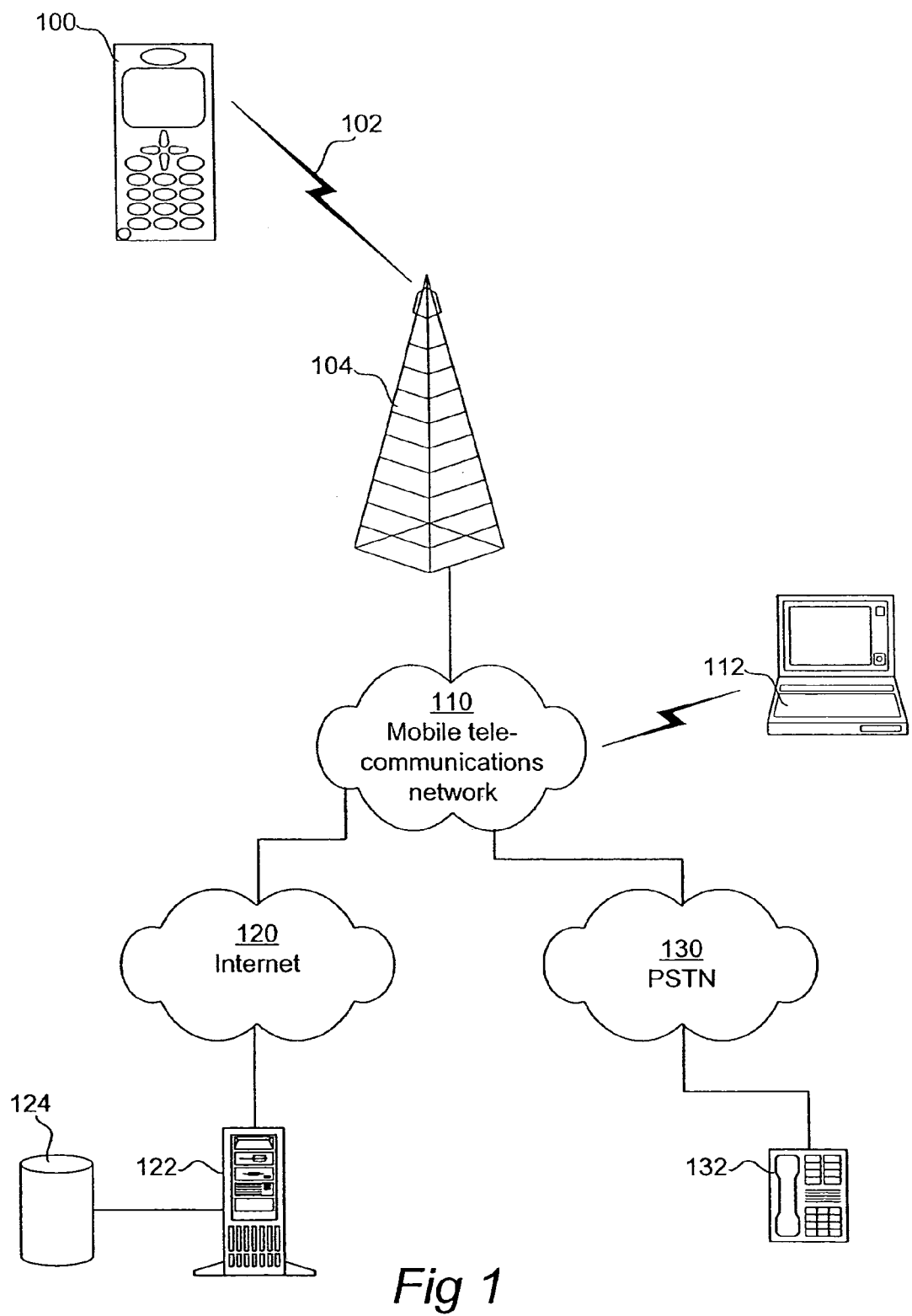
FIG. 1 is a schematic illustration of a telecommunication system, in which the present invention may be applied.

FIG. 1 is a schematic illustration of a telecommunication system, in which the present invention may be applied. In the system of FIG. 1, audio data may be communicated between various units 100, 112, 122 and 132 by means of different networks 110, 120 and 130. The audio data may represent speech, music or any other type of acoustic information. Hence, speech may be communicated from a user of a stationary telephone 132 through a public switched telephone network (PSTN) 130 and a mobile telecommunications network 110, via a base station 104 thereof across a wireless communication link 102 to a mobile telephone 100, and vice versa. The mobile telephone may be any commercially available device for any known mobile telecommunications system, such as GSM, UMTS or D-AMPS.

Moreover, digitally encoded music, which is stored in a database 124, may be delivered from a server 122 over the Internet 120 and the mobile telecommunications network 110 to the mobile telephone 100, or to another portable device 112 having access to the mobile telecommunications network 110. The portable device 112 may, for instance, be a personal digital assistant, a laptop computer with a GSM or UMTS interface, a smart headset or another accessory for such devices, etc. Instead of being stored in a database 124, audio data provided by the server 122 may be read directly from an optical storage, such as a CD or DVD. Moreover, the server 122 may be connected to or included in a radio broadcast station so as to provide streaming audio services across the Internet 120 to the portable devices 100, 112.

Thus, the system illustrated in FIG. 1 serves exemplifying purposes only, and various other situations where audio data is communicated between different units are possible within the scope of the invention.

Figure 2:
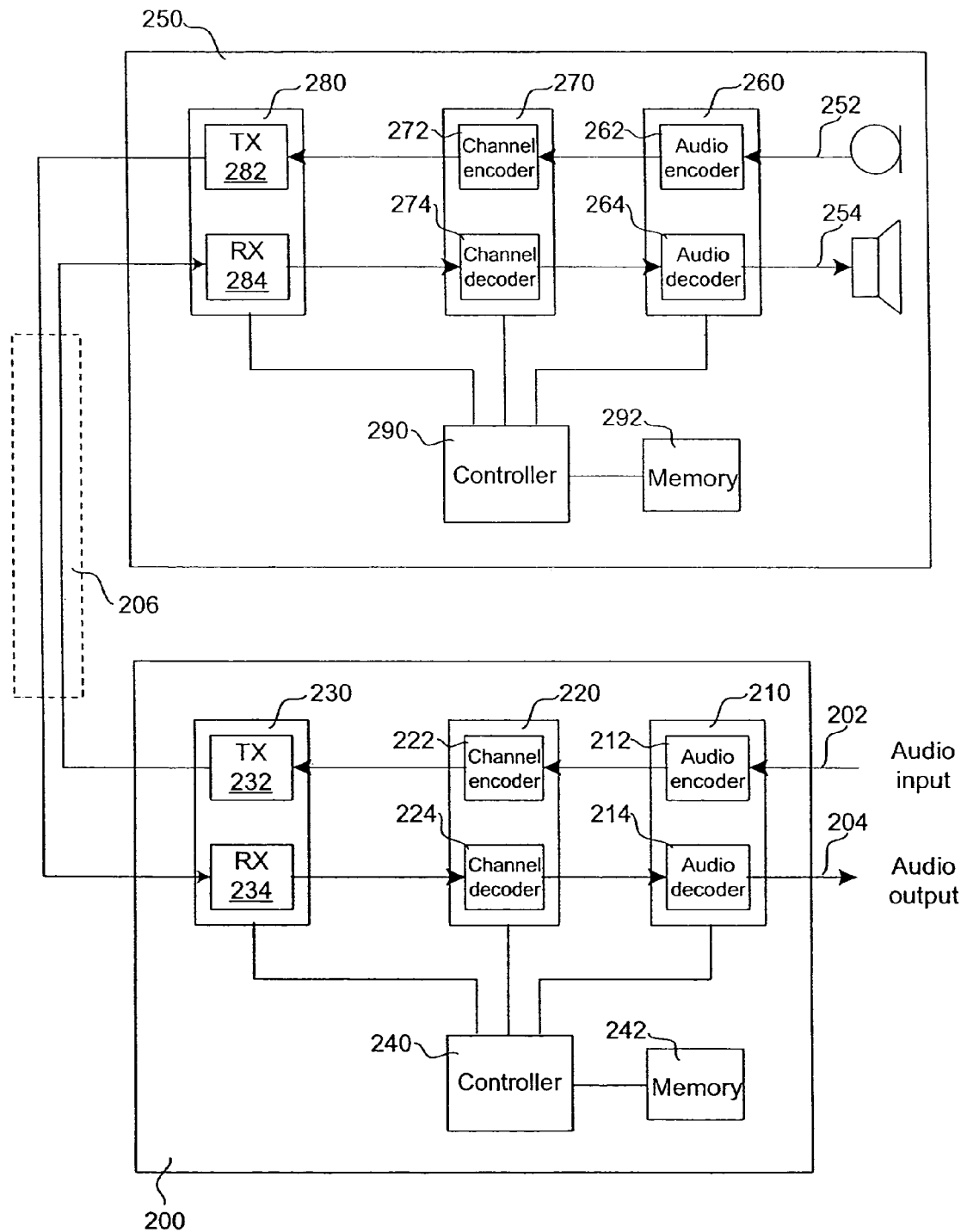
FIG. 2 is a schematic block diagram illustrating some of the elements of FIG. 1.

FIG. 2 presents a general block diagram of a mobile audio data transmission system, including a mobile terminal 250 and a network station 200. The mobile terminal 250 may for instance represent the mobile telephone 100 of FIG. 1, whereas the network station 200 may represent the base station 104 of the mobile telecommunications network 110 in FIG. 1.

The mobile terminal 250 may communicate speech through a transmission channel 206 (e.g. the wireless link 102 between the mobile telephone 100 and the base station 104 in FIG. 1) to the network station 200. A microphone 252 receives acoustic input from a user of the mobile terminal 250 and converts the input to a corresponding analog electric signal, which is supplied to an audio encoding/decoding block 260. This block has an audio encoder 262 and an audio decoder 264, which together form an audio codec. The analog microphone signal is filtered, sampled and digitized, before the audio encoder 262 performs audio encoding applicable to the mobile telecommunications network. An output of the audio encoding/decoding block 260 is supplied to a channel encoding/decoding block 270, in which a channel encoder 272 will perform channel encoding upon the encoded audio signal in accordance with the applicable standard in the mobile telecommunications network.

An output of the channel encoding/decoding block 270 is supplied to a radio frequency (RF) block 280, comprising an RF transmitter 282, an RF receiver 284 as well as an antenna (not shown in FIG. 2). As is well known in the technical field, the RF block 280 comprises various circuits such as power amplifiers, filters, local oscillators and mixers, which together will modulate the encoded audio signal onto a carrier wave, which is emitted as electromagnetic waves propagating from the antenna of the mobile terminal 250.

After having been communicated across the channel 206, the transmitted RF signal, with its encoded audio data included therein, is received by an RF block 230 in the network station 200. In similarity with block 280 in the mobile terminal 250, the RF block 230 comprises an RF transmitter 232 as well as an RF receiver 234. The receiver 234 receives and demodulates, in a manner which is essentially inverse to the procedure performed by the transmitter 282 as described above, the received RF signal and supplies an output to a channel encoding/decoding block 220. A channel decoder 224 decodes the received signal and supplies an output to an audio encoding/decoding block 210, in which an audio decoder 214 decodes the audio data which was originally encoded by the audio encoder 262 in the mobile terminal 250. A decoded audio output 204, for instance a PCM signal, may be forwarded within the mobile telecommunications network 110 (to be transmitted to another mobile terminal included in the system) or may alternatively be forwarded to e.g. the PSTN 130 or the Internet 120.

When audio data is communicated in the opposite direction, i.e. from the network station 200 to the mobile terminal 250, an audio input signal 202 (such as a PCM signal) is received from e.g. the server 122 or the stationary telephone 132 by an audio encoder 212 of the audio encoding/decoding block 210. After having applied audio encoding to the audio input signal, channel encoding is performed by a channel encoder 222 in the channel encoding/decoding block 220. Then, the encoded audio signal is modulated onto a carrier wave by a transmitter 232 of the RF block 230 and is communicated across the channel 206 to the receiver 284 of the RF block 280 in the mobile terminal 250. An output of the receiver 284 is supplied to the channel decoder 274 of the channel encoding/decoding block 270, is decoded therein and is forwarded to the audio decoder 264 of the audio encoding/decoding block 260. The audio data is decoded by the audio decoder 264 and is ultimately converted to an analog signal, which is filtered and supplied to a speaker 254, that will present the transmitted audio signal acoustically to the user of the mobile terminal 250.

As is generally known, the operation of the audio encoding/decoding block 260, the channel encoding/decoding block 270 as well as the RF block 280 of the mobile terminal 250 is controlled by a controller 290, which has associated memory 292. Correspondingly, the operation of the audio encoding/decoding block 210, the channel encoding/decoding block 220 as well as the RF block 230 of the network station 200 is controlled by a controller 240 having associated memory 242.

Figure 3:
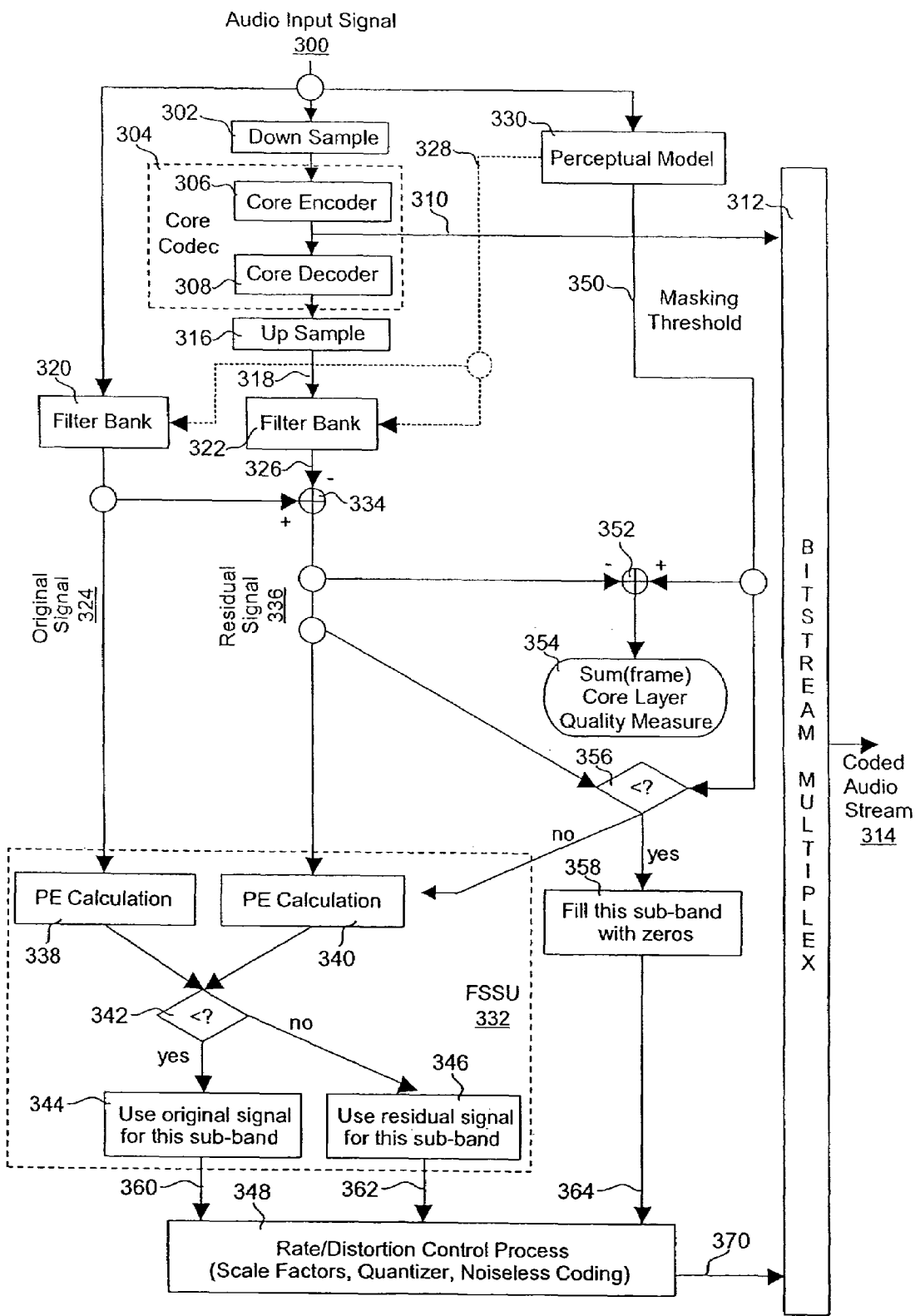
FIG. 3 is a schematic block diagram of a scalable audio encoder according to a preferred embodiment.

FIG. 3 illustrates the audio encoder 262 and/or the audio encoder 212 of FIG. 2 in more detail. In the preferred embodiment, the audio encoder 262 and/or the audio encoder 212 includes an AMR-WB core layer codec 304, which is of CELP type, as well as an AAC enhancement layer codec, which is formed by the majority of the elements in FIG. 3. The enhancement layer codec of the preferred embodiment is an MPEG-4 AAC codec; however MPEG-2 AAC, ISO/MPEG Audio Layer-3 (MP3), or any other frequency transforming codec operating with e.g. discrete cosine transform or wavelet transform could be used as the enhancement layer codec within the scope of the invention. The selection of the core layer codec is not central to the present invention; various other known codecs (advantageously but not necessarily CELP codecs) may be used instead of the AMR-WB CELP codec 304, including but not limited to MP3, AAC, AMR-NB (Adaptive Multi-Rate Narrow Band) or EFR (Enhanced Full Rate).

Scalable audio encoding involving CELP core layer encoding as well as AAC enhancement layer encoding is well known per se in the technical field; thus no detailed explanation is required herein. Reference is for instance made to ISO/IEC 14496-3:2001(E), Subpart 4. Moreover, AMR-WB CELP codecs are described in 3rd Generation Partnership Project (3GPP) TS 26.190 V5.0.0 (2001-03). Therefore, for reasons of clarity, FIG. 3 is not a complete illustration of an AMR-WB CELP core layer and AAC enhancement layer audio encoder but rather serves to illustrate the central aspects of the present invention. Thus, some audio encoder elements have been omitted for the AAC enhancement layer codec in FIG. 3, for instance:

TNS (Temporal Noise Shaping). Flattens the temporal envelope of the audio signal to be encoded so as to control the fine time structure of the coding noise.

LTP (Long Term Prediction) and Prediction. Reduces the redundancy of the audio signal by way of prediction.

Intensity/Coupling. Improves stereo coding efficiency.

PNS (Perceptual Noise Substitution). Provides an efficient representation of noise-like channels.

M/S (Mid/Side stereo). Enhances the stereo imaging quality and, to some extent, improves the coding efficiency.

As seen in the drawing, the audio encoder receives a digital non-compressed audio input signal 300, such as a PCM signal or, in essence, any other digital audio signal known in the technical field. The audio signal may for instance be supplied from the music or radio broadcast streaming server 122 in FIG. 1, from the PSTN 130 as a voice signal, etc. Alternatively, the audio encoder may be adapted to receive an analog electric signal from e.g. a microphone and convert the analog signal into a digital signal through conventional A/D conversion, as is readily appreciated by a man skilled in the art.

In the preferred embodiment, audio encoding is performed on a frame-by-frame basis, where each frame involves a plurality of audio samples within a predetermined time period, such as a multiple of 10 ms. The audio samples of adjacent frames may either be non-overlapping or partly overlapping.

The input signal 300 is supplied to a perceptual model 330, the purpose of which will be explained later. Moreover, the input signal 300 is supplied to the core layer codec 304 in the following manner. First, the input signal 300 is down sampled, at 302, to a sampling rate suitable for the core layer codec 304. Then, core layer encoding is performed at 306, and a core layer output 310 is multiplexed at 312, together with an output 370 from the enhancement layer codec, to form an encoded audio output stream 314, which is then channel encoded at 222 in FIG. 2.

Moreover, the core layer codec 304 decodes the encoded core layer signal at 308 and up samples, at 316, the decoded result so as to produce a reconstructed core layer signal 318, which is a representation of the signal after core layer encoding and decoding. Like all perceptual audio coding, the core layer codec 304 introduces some distortion in the audio data. Therefore, the reconstructed core layer signal 318 will not be the same as the original input signal 300.

The original input signal 300 is transformed, in a filter bank 320, into a corresponding signal 324 in the frequency domain. Correspondingly, the reconstructed core layer signal 318 is transformed, in a filter bank 322, to the frequency domain. Even if illustrated as separate elements in FIG. 3, the filter banks 320 and 322 may be implemented as one common filter bank, which applies a modified discrete cosine transform (MDCT) according to the MPEG-4 standard.

Figure 4:
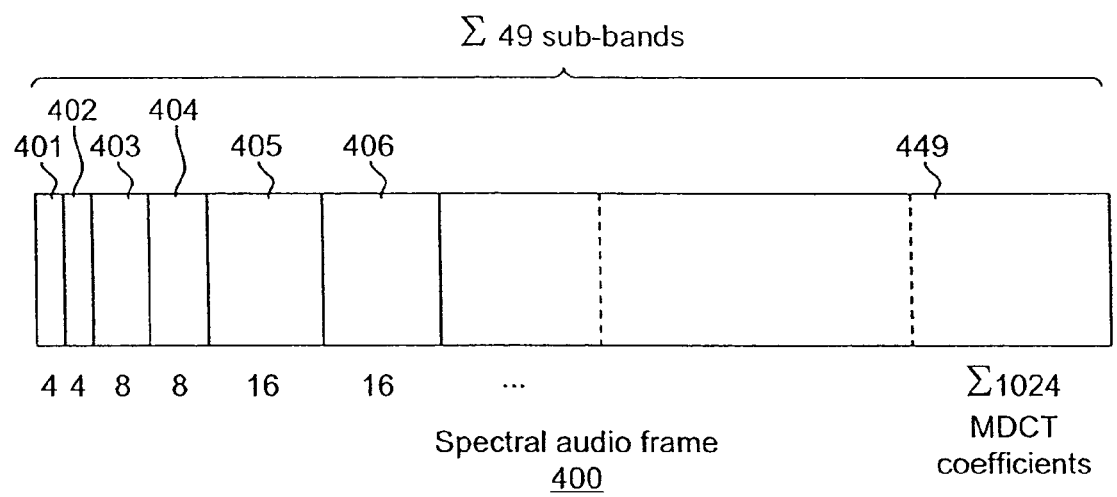
FIG. 4 illustrates an exemplifying spectral audio frame format, which has a plurality of frequency sub-bands and which may be used for the present invention.

As indicated by a dashed line 328 in FIG. 3, the filter banks 320, 322 may optionally be controlled by an output from the perceptual model 330 so as to reduce the window length of the filter banks, if necessary. The MDCT transforms in the filter banks 320 and 322 produce spectral audio frames having a plurality of frequency sub-bands. FIG. 4 illustrates one example of such an audio frame 400, having 49 sub-bands 401, 402, . . . , 449 with 1024 MDCT coefficients in total. The sub-bands may be partly overlapping or, alternatively, non-overlapping. As seen in FIG. 4, lower frequency sub-bands have fewer MDCT coefficients per sub-band than higher frequency sub-bands. The transformed original signal 324 is fed to a Frequency Selective Switching Unit (FSSU) 332 and, moreover, to a subtracting unit 334, which also receives the transformed core layer signal 326. The subtracting unit 334 produces a residual signal 336 by subtracting the MDCT coefficients of the core layer signal 326 from those of the original signal 324. The residual signal 336 is supplied to the FSSU 332 and is an indication of the error caused by the core layer codec 304.

For each sub-band 401-449 of the spectral audio frame 400, the FSSU 332 calculates the perceptual entropies 338, 340 of the original signal 324 and the residual signal 332, respectively. The perceptual entropy, which is related to the estimated amount of bits needed for encoding an individual sub-band, may be calculated as $$\text{Perceptual Entropy} = \frac{\text{Signal Energy}}{\text{Masking Threshold}},$$

where the signal energy may be calculated according to any of the various ways that are well known in the technical field. The masking threshold is provided by the perceptual model 330 and represents the limit below which the contents of the sub-band are not audible to the human ear. The masking threshold, too, may be determined in various ways, one of which is described in Wang, Y., Vilermo, M. "An Excitation Level Based Psychoacoustic Model for Audio Compression", The 7th ACM International Multimedia Conference, Oct. 30 to Nov. 4, 1999 Orlando, Fla., USA, and is incorporated herewith by reference.

Figure 5:
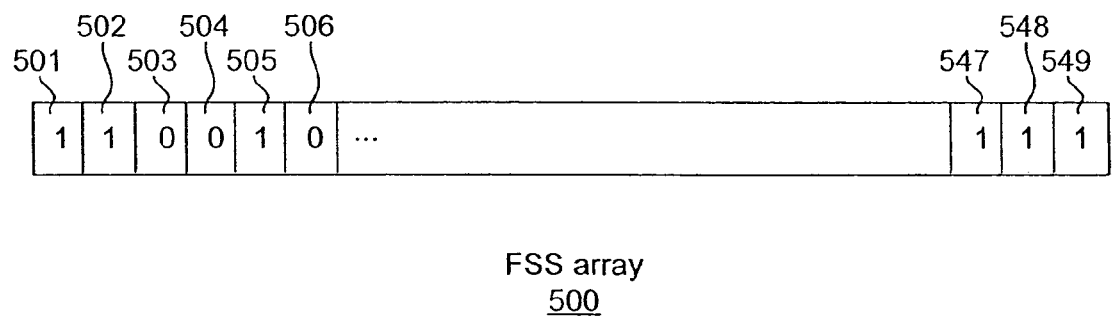
FIG. 5 illustrates a Frequency Selective Switching (FSS) array, which serves to indicate the origins of the encoded audio signal for the different frequency sub-bands of the audio frame shown in FIG. 4.

At 342 the FSSU 332 compares the calculated perceptual entropies 338, 340, determines which one of the signals 324 and 336 has the lowest perceptual entropy (and, thus, will require less bits for encoding with the same quality) and accordingly sets an individual control information flag 501-549 in an FSS array 500 shown in FIG. 5. Thus, either the original signal 324 or the residual signal 336 is selected, at 344 and 346, respectively, as output 360 and 362, respectively, from the FSSU 332 for the different sub-bands 401-449. Each sub-band 401-449 of the audio frame 400 has a respective individual flag 501-549, which is preferably represented by a single binary bit. The FSS array will be communicated together with the encoded audio data 310, 370 in the multiplexed bitstream 314 to the receiver side and will indicate to the decoder whether to add the enhancement layer signal to the core layer signal when decoding the received encoded audio data.

The output from the FSSU 332 is assembled, in accordance with the bit settings in the FSS array 500, by copying the MDCT coefficients of the original signal 324/360 or the residual signal 336/362 for each individual frequency band 401-449 into one common frame array, having the format shown in FIG. 4. This assembled output corresponds to an ordinary AAC enhancement layer codec and is supplied to a Rate/Distortion Control Process 348, which will be described in more detail later with reference to FIGS. 6 and 7.

In addition to the above and in accordance with the preferred embodiment, the residual signal 336 is in parallel compared to the masking threshold 350 for the current frequency band 401-449, as can be seen at 356. If the residual signal is indeed found to be below the masking threshold, this means that the error caused by the core layer codec 304 is not audible in the current frequency band. Therefore, in such a case it is sufficient to encode only zeros as an enhancement signal in this particular frequency band, as shown at 358 and 364. This condition has the highest priority and overrules the output 360/362 of the perceptual entropy calculation, thereby offering an additional advantage in a slightly faster computation of the subsequent quantization process.

Moreover, at 352 and 354 the difference between the masking threshold 350 and the residual signal 334 is calculated for each frequency band 401-449. For improved accuracy, Fast Fourier Transform (FFT) rather than MDCT coefficients may be used for this calculation. The results are accumulated for every frame 400 and reflect a measure for the quality of the core layer, i.e. an indication whether the core layer codec 304 has performed well or bad when encoding the audio input signal 300 at the core layer. As will be described later, the core layer quality measure will for each frame be used as a multiplication factor (see 710 in FIG. 7), which is applied to the quantization error in the subsequent quantization process in 348, before comparing it to the residual signal.

Figure 6:
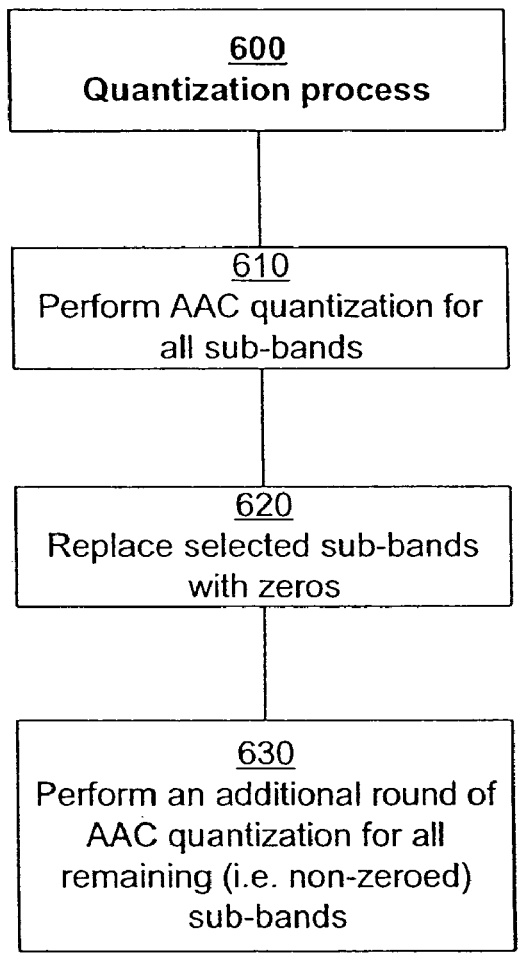
FIG. 6 briefly illustrates the main steps for quantizing the audio signal with minimized quantization errors and optimum bit rates according to the preferred embodiment.

The Rate/Distortion Control Process 348, as modified according to the preferred embodiment, will now be described with reference to FIGS. 6 and 7. It is based on the normal Rate/Distortion Control Process in AAC, that involves a Scale Factors unit, a Quantization unit and a Noiseless Coding unit, which are described in detail in Annex 4.B.10-11 of aforesaid ISO/IEC 14496-3:2001(E), Subpart 4.

The main purpose of the Rate/Distortion Control Process is to provide quantization and noiseless coding of the audio signal to be encoded. According to the preferred embodiment, the quantization process 600 is divided into a two-stage procedure: Initially, a first AAC quantization process 610 is performed for all sub-bands. This first AAC quantization process is modified compared to standard AAC quantization in the sense that the quantization error is repeatedly evaluated in view of the residual signal, and that it may be decided, in response to this evaluation, to replace the residual signal with zeros for some sub-bands. The actual replacement occurs only once all sub-bands have been processed, as indicated at 620 in FIG. 6. Finally, a second AAC quantization process 630 is performed for all remaining (i.e., non-zeroed) sub-bands; this time, however, without any zero replacements.

Figure 7:
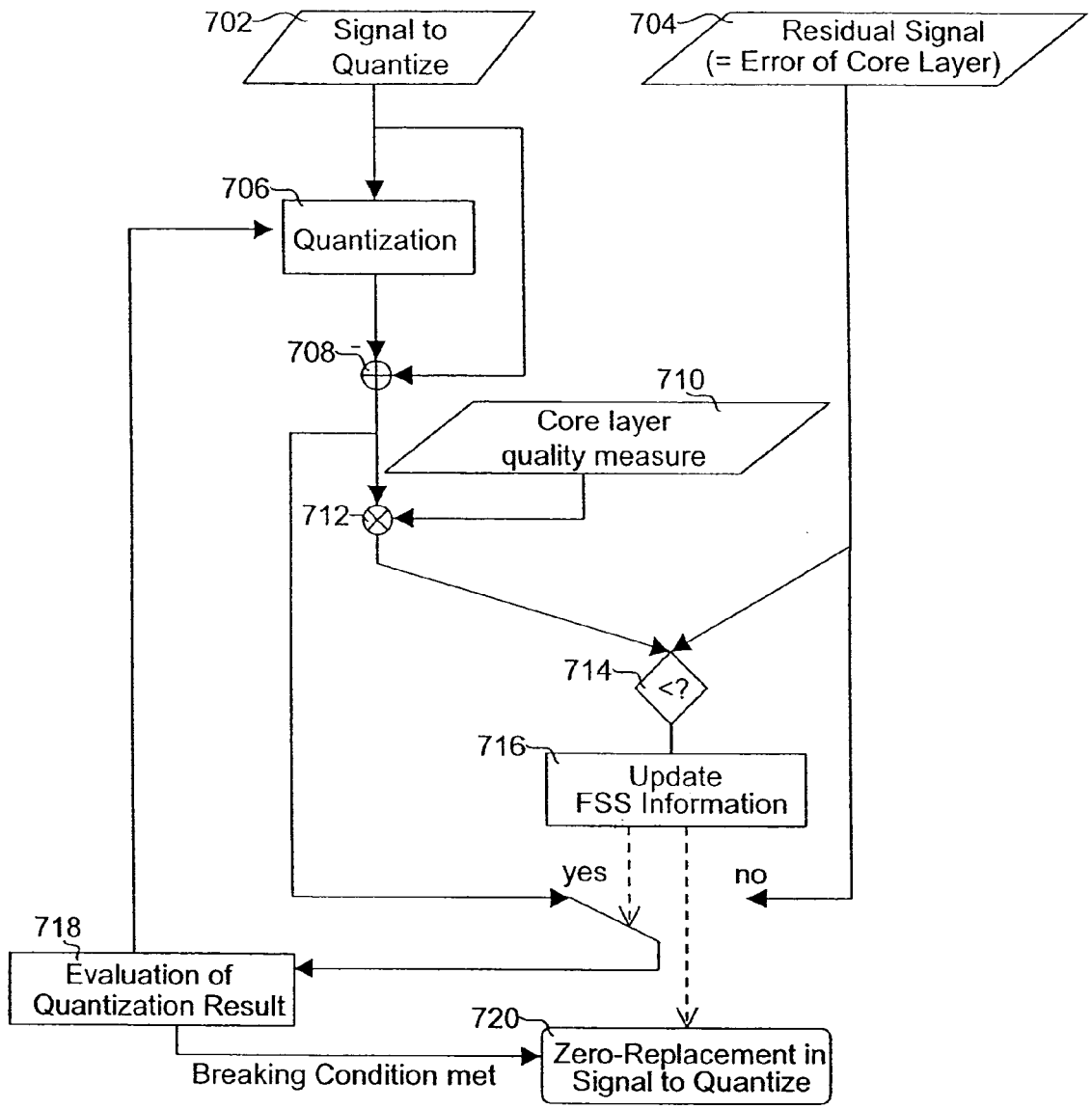
FIG. 7 illustrates a modified AAC Rate/Distortion Control Loop for performing the quantization of FIG. 6.

The modified Rate/Distortion Control Process of the AAC quantization 610 is illustrated in more detail in FIG. 7. A signal 702 is supplied from the FSSU 332 and represents the current frequency domain samples to be quantized. At 706, the samples are quantized several times in different ways with different scale factors. After each quantization the quantization error is calculated at 708 and evaluated at 718. Each time the process tries to improve the "coloring" of the quantization noise, i.e. the process tries to distribute the available bits to different frequency bands in a way that minimizes the audibility of the quantization noise. This is done by changing the scale factors for different frequency bands. The scale factors (one for each band) control the quantization step size, thus allocating different amount of noise to each frequency band. After each quantization round, the noise in each band is checked, and in the bands where the noise is most disturbing, the quantization step size is reduced in the next round.

However, this process does not necessarily converge to a global optimum, and consequently, for some frequency bands, the core codec may produce a smaller error than the quantized residual. For these bands, it is then advantageous to instead use the core codec signal alone. It is to be noted that the signal under quantization can be either the original signal or the residual signal (core codec signal subtracted from the original signal).

Thus, the following is performed with reference to blocks 710-720 in FIG. 7. Rather than merely checking the quantization noise after each quantization round, the minimum of the quantization noise and the noise that would result from using the core codec output alone (i.e. the residual signal 704 supplied from the FSSU 332) is checked at 714. If the core codec output is good enough, there is no need to reduce the quantization step size for this frequency band. If both the quantization noise and the core codec noise are too high, the step size is reduced.

If the core codec does a good job in general (as would happen with speech signals and a speech core codec), it is advantageous to modify the error calculation even further. If the core codec does a good job, this will be reflected in the values of the core layer quality measure 710, as derived at 354 in FIG. 3. In such a case small errors in the core codec signal can be ignored, and the core codec signal can still be used alone, even if the errors caused by using the core codec alone would be slightly larger than the quantization errors. Using the core codec signal in frequency bands where the core codec error is slightly larger than the quantization error will make bits available for use in other bands, where the core codec error is much larger than the quantization error. Therefore, the quantization error produced at 708 is multiplied by a function of the core layer quality measure at 712 in FIG. 7, before being compared to the core layer noise at 714. This function may, for instance, be based on a simple threshold. If the core codec does a good job, the core layer quality measure remains above the threshold (e.g. 0), and the quantization error is multiplied by a predetermined constant, such as 4. Otherwise the quantization error remains unchanged in the comparison at 714.

The quantization loop thus formed has three breaking conditions:

1. no perceptible quantization error appeared,
2. no further reduction of the quantization error is possible, and
3. the maximum limit of loop runs has been reached.

After having run several quantization rounds, the breaking conditions will be met. In case it is still better, in some frequency bands, to use the core codec output instead of the quantized result, the quantized signal is replaced with zeros in these bands, as indicated at 720. Additionally, the FSS information will be marked (see 716) for these band to indicate that the residual signal is to be used, effectively resulting in the decoder only using the core codec signal in these bands. (In the last case, the bits will not be reallocated, but the method results in bit savings.)

If there are frequency bands that are replaced by zeros, the quantized signal needs fewer bits than was calculated. By using a bit buffer between frames, these bits can be left for the following frames to be used. These bits can also be used to improve the quantization of the current frame by running the quantization loop again, as indicated at 630 in FIG. 6, but this time starting with the end result achieved the first time, i.e. in step 610 of FIG. 6, and including possible zero replacements in some frequency bands, as discussed above. During the second quantization process 630, the signal is quantized without the modifications in the error calculation explained for the first quantization process 610, i.e. the quantization in step 630 conforms fully to the MPEG-4 AAC standard.

As an alternative to the above, it is possible to decide which sub-bands to replace by zeros as well as to determine the bit rates of the remaining (non-zeroed) sub-bands in one common quantization process, rather than performing a first quantization process for all sub-bands, replacing the relevant sub-bands by zeros and then performing an additional quantization process for the remaining sub-bands.

The audio encoder according to the invention may advantageously be included in an audio transcoder in e.g. a GSM or UMTS network. In GSM, such an audio transcoder is called a transcoder/rate adapter unit (TRAU) and provides conversion between 64 kbps PCM speech from the PSTN 130 to full rate (FR) or enhanced full rate (EFR) 13-16 kbps digitized GSM speech, and vice versa. The audio transcoder may be located at the base transceiver station (BTS), which is part of the base station sub-system (BSS), or alternatively at the mobile switching center (MSC).

The scalable audio encoding functionality described above may be realized as an integrated circuit (ASIC) or as any other form of digital electronics. In an alternative embodiment, aforesaid scalable audio encoding functionality may be implemented as a computer program product, which is directly loadable into a memory of a processor—advantageously the controller 240/290 and its associated memory 242/292 of the network station 200/mobile station 250 of FIG. 2. The computer program product comprises program code for providing the scalable audio encoding functionality when executed by said processor.

The audio encoder according to the invention may also be included in a network server (such as the server 122 in FIG. 1) for providing audio services to network clients (such as the portable devices 100, 112 in FIG. 1).

As previously explained, no changes have to be made to the decoder side in the above embodiments of the invention, since the decoder will add the MDCT coefficients of the preceding layer output signal in every sub-band 401-449 that is marked in the FSS array 500. However, an alternative embodiment of the invention involves a modified decoder, which is adapted to receive a layered data stream containing an encoded first layer signal and at least one encoded second layer signal. The data stream will contain encoded frames with a plurality of spectral sub-bands but may otherwise have an arbitrary known format. After having decoded both the first layer signal and the second layer signal, the decoder analyzes the second layer signal and determines a perceptual quality measure for each sub-band. Then, the decoder decides whether the perceptual quality measure meets predetermined criteria, and, if so, the second layer signal is combined with the first layer signal for the sub-band in question so as to produce a decoded output signal. Otherwise, the decoded output signal is produced from the first layer signal alone for this sub-band, i.e., the second layer signal is replaced with zeros.

The perceptual quality measure may be included in the received layered data stream, i.e. originate from the encoder side. Alternatively, the decoder may derive the perceptual quality measure by identifying, in the decoded second layer signal, unnatural audio components such as spikes, noise or unexpected waveforms and consequently deciding that the decoded second layer signal is distorted and should not be added to the decoded first layer signal.

The invention has mainly been described above with reference to a preferred embodiment. However, as is readily appreciated by a person skilled in the art, other embodiments than the ones disclosed above are equally possible within the scope of the invention, as defined by the appended patent claims.

It is to be emphasized that the invention is not limited to a base layer and one enhancement layer; the principles of the invention may just as well be applied to two subsequent enhancement layers in a multi-layer audio encoding technique. Additionally, in an alternative embodiment, the FSS information is used and transmitted to the receiver side only for some frequency bands, not all of them. This may be useful in a situation where the enhancement layer is used for improving the high frequencies only. Thus, there is no need to send the FSS information for the low frequencies. Of course, the receiver side must be notified of this fact—either by default or through initial handshaking with the transmitter side.

Moreover, the audio encoder, decoder, transcoder, computer program and integrated circuit described above are not limited to the locations exemplified above. For instance, the audio encoder may be located in any of the audio transmitting devices shown in FIG. 1, or in another audio transmitting device not explicitly shown or described herein.

We claim:

1. An audio encoding method of coding audio signals into a layered data stream having a first layer and a second layer, said second layer serving as an enhancement of said first layer, the method comprising
    forming an original digital audio signal,
    encoding said original signal to obtain a first layer signal,
    producing a residual signal to reflect a difference between the original signal and the first layer signal,
    evaluating the residual signal; and, in case the result of the evaluation meets given criteria,
    selecting a predetermined low-entropy signal to be encoded as a second layer signal, and, otherwise,
    selecting either said original signal or said residual signal to be encoded as said second layer signal, and
    producing said second layer signal by encoding said selected signal.

2. A method according to claim 1, wherein said original digital audio signal and said residual signal comprise a plurality of frequency bands, and wherein said steps of evaluating said residual signal and selecting said predetermined low-entropy signal are performed individually for components of said residual signal corresponding to said plurality of frequency bands.

3. A method according to claim 1, wherein said step of evaluating includes comparing the residual signal to a masking threshold and wherein said criteria include that the residual signal is found to be below the masking threshold.

4. A method according to claim 1, wherein said step of evaluating includes calculating an error caused by quantization of either said original signal or said residual signal.

5. A method according to claim 4, wherein said criteria include that the error caused by quantization is perceptible.

6. A method according to claim 4, wherein said criteria include that the error caused by quantization is larger than the residual signal.

7. A method according to claim 2, comprising the additional step of increasing the bit rate of at least one of said plurality of frequency bands, for which said predetermined low-entropy signal has not been selected.

8. A method according to claim 2, comprising the additional step of reducing the total bit rate for said plurality of frequency bands as a whole.

9. A method according to claim 2, comprising the additional step of reducing the quantization error of at least one of said plurality of frequency bands, for which said predetermined low-entropy signal has not been selected.

10. A method according to claim 1, wherein the predetermined low-entropy signal is a constant low-amplitude signal.

11. A method according to claim 10, wherein the predetermined low-entropy signal has zero amplitude.

12. A method according to claim 1, wherein said first layer signal is a core layer signal.

13. A method according to claim 12, wherein said first layer signal is produced by adaptive multi-rate wideband encoding.

14. A method according to claim 1, wherein said second layer signal is produced by advanced audio coding encoding.

15. A method according to claim 2, comprising the additional steps of
    accumulating, for said plurality of frequency bands, a core layer quality measure by summing together differences between masking thresholds and residual signal components for the individual frequency bands, and
    using the core layer quality measure when evaluating the residual signal.

16. A method according to claim 1, comprising the additional step of decoding said first layer signal to obtain a decoded first layer signal, wherein the residual signal reflects a difference between the original signal and the decoded first layer signal.

17. A computer readable medium with a computer program stored thereon, wherein the computer program comprises program code for performing the method according to claim 1 when executed by a processor.

18. An integrated circuit, which is adapted to perform the method according to claim 1.

19. An audio encoder for coding audio signals into a layered data stream having a first layer and a second layer, said second layer serving as an enhancement of said first layer, the encoder comprising:
    a first encoder element, capable of encoding an original digital audio signal into a first layer signal;
    a subtracting unit adapted to produce a residual signal to reflect a difference between the original signal and the first layer signal;
    a first selector adapted to select either said original signal or said residual signal for encoding as a second layer signal;
    a second encoder element, capable of producing said second layer signal by encoding said selected signal;
    an evaluating unit adapted to evaluate the residual signal and provide an indication that the result of the evaluation meets given criteria; and
    a second selector, said second selector being associated with said evaluating unit and being adapted, upon receiving said indication, to select, instead of said original signal or said residual signal, a predetermined low-entropy signal to be encoded by said second encoder element.

20. An audio encoder according to claim 19, wherein said original digital audio signal and said residual signal comprise a plurality of frequency bands, and wherein said evaluating unit and said second selector are adapted to operate on individual ones of said plurality of frequency bands.

21. An audio encoder according to claim 19, wherein said first encoder element is an Adaptive Multi-Rate Wideband (AMR-WB) encoder.

22. An audio encoder according to claim 19, wherein said second encoder element is an advanced audio coding encoder.

23. An audio transcoder comprising an audio decoder, wherein said audio decoder is adapted to receive and decode an audio input signal, which is encoded according to an audio encoding technique known per se, the audio transcoder further comprising an audio encoder according to claim 19.

24. A station for a mobile telecommunications network, comprising an audio encoder according to claim 19.

25. A station as in claim 24, wherein the station is a base station.

26. A station as in claim 24, wherein the station is a mobile terminal.

27. A station for a mobile telecommunications network, comprising an audio transcoder according to claim 23.

28. A station as in claim 27, wherein the station is a base station.

29. A station as in claim 27, wherein the station is a mobile terminal.

* * * * *